(12) United States Patent
Williamson

(10) Patent No.: US 9,069,741 B2
(45) Date of Patent: Jun. 30, 2015

(54) EMULATING LEVEL TRIGGERED INTERRUPTS OF PHYSICAL DEVICES ASSIGNED TO VIRTUAL MACHINE

(71) Applicant: Red Hat, Inc., Raleigh, NC (US)

(72) Inventor: Alex Williamson, Fort Collins, CO (US)

(73) Assignee: Red Hat, Inc., Raleigh, NC (US)

( * ) Notice: Subject to any disclaimer, the term of this patent is extended or adjusted under 35 U.S.C. 154(b) by 307 days.

(21) Appl. No.: 13/776,288

(22) Filed: Feb. 25, 2013

(65) Prior Publication Data

US 2014/0244877 A1    Aug. 28, 2014

(51) Int. Cl.
  *G06F 13/24*    (2006.01)
  *G06F 9/455*    (2006.01)

(52) U.S. Cl.
  CPC ............... *G06F 13/24* (2013.01); *G06F 9/455* (2013.01); *G06F 2213/0058* (2013.01); *G06F 2213/24* (2013.01); *G06F 2213/2414* (2013.01)

(58) Field of Classification Search
  CPC ............ G06F 13/24–13/26; G06F 2213/0058; G06F 2213/24; G06F 2213/2414; G06F 2213/2418; G06F 2213/2424; G06F 9/455
  USPC ................................................. 710/260–269
  See application file for complete search history.

(56) References Cited

U.S. PATENT DOCUMENTS

| | | | | |
|---|---|---|---|---|
| 5,155,812 | A * | 10/1992 | Ehlig et al. ...................... | 710/59 |
| 7,209,994 | B1 * | 4/2007 | Klaiber et al. ................ | 710/264 |
| 7,707,341 | B1 * | 4/2010 | Klaiber et al. ................ | 710/244 |
| 7,853,744 | B2 * | 12/2010 | Mahalingam et al. ........ | 710/262 |
| 8,032,680 | B2 * | 10/2011 | Ganguly ........................ | 710/264 |
| 8,453,143 | B2 * | 5/2013 | Mahalingam et al. ............ | 718/1 |
| 8,504,752 | B2 * | 8/2013 | Arinobu et al. ............... | 710/262 |
| 8,527,673 | B2 * | 9/2013 | Mahalingam et al. .......... | 710/26 |
| 2004/0025158 | A1 * | 2/2004 | Traut ................................ | 718/1 |
| 2005/0080970 | A1 * | 4/2005 | Jeyasingh et al. ............. | 710/266 |
| 2005/0228923 | A1 * | 10/2005 | Zimmer et al. ............... | 710/269 |
| 2007/0124523 | A1 * | 5/2007 | Shimizu et al. ............... | 710/260 |
| 2008/0294808 | A1 * | 11/2008 | Mahalingam et al. .......... | 710/26 |
| 2008/0294825 | A1 * | 11/2008 | Mahalingam et al. ........ | 710/262 |
| 2009/0133042 | A1 * | 5/2009 | Forin et al. .................... | 719/331 |
| 2009/0210888 | A1 * | 8/2009 | Lee et al. ....................... | 719/321 |
| 2009/0328035 | A1 * | 12/2009 | Ganguly ........................... | 718/1 |
| 2010/0191889 | A1 * | 7/2010 | Serebrin ....................... | 710/269 |
| 2011/0106993 | A1 * | 5/2011 | Arinobu et al. ............... | 710/262 |
| 2011/0161541 | A1 * | 6/2011 | Madukkarumukumana et al. ............................ | 710/260 |

* cited by examiner

*Primary Examiner* — Ryan Stiglic
(74) *Attorney, Agent, or Firm* — Haynes and Boone, LLP

(57) ABSTRACT

Systems and methods are disclosed for handling a level triggered interrupt generated by a device assigned to a virtual machine running on a host machine. An example system includes a host machine that hosts a virtual machine and a device coupled to the host machine. The device is assigned to the virtual machine and generates one or more interrupts. The example system also includes an interrupt handler that receives an interrupt generated by the device, masks the interrupt, injects the interrupt into the virtual machine, receives an indication that the virtual machine has attempted to access the device, and in response to the indication that the virtual machine has attempted to access the device, unmasks the interrupt from the device.

18 Claims, 6 Drawing Sheets

EMULATING LEVEL TRIGGERED INTERRUPTS OF PHYSICAL DEVICES ASSIGNED TO VIRTUAL MACHINE

BACKGROUND

The present disclosure generally relates to a computing system, and more particularly to the management of an interrupt in a computer system.

In a computer system, an interrupt is a signal generated by a device to indicate the need of attention from a central processing unit (CPU) and/or its operating system. An interrupt may be generated by, for example, a hard disk signaling that it has read a series of data blocks or a network device signaling that it has processed a buffer containing network packets. The interrupt is typically delivered to the CPU. When the CPU receives the interrupt, the CPU saves its state of execution and begins execution of the interrupt handler.

If the device asserts a level triggered interrupt, the interrupt signal remains high until the interrupt is cleared. The level triggered interrupt automatically re-interrupts the processor if the interrupt is not cleared. When a device signals a level triggered interrupt, the interrupt handler may identify the source and specific cause of the interrupt and service the interrupt, thereby de-asserting the interrupt source. The interrupt handler handling the level-triggered interrupt may perform specific operations to ensure the interrupt signal is brought to an inactive state. Otherwise, the device may constantly generate interrupts to the processor.

In a typical, non-virtualized environment, the guest operating system may service the interrupt. When the device is assigned to a virtual machine, the host operating system is no longer directly in control of identifying the cause of the interrupt, nor does the host operating system know how to service the interrupt. It may be desirable for the host machine to protect the overall system from devices that may interrupt many times while waiting for the guest operating system to service the device.

BRIEF SUMMARY

This disclosure relates to handling a level triggered interrupt generated by a device assigned to a virtual machine running on a host machine. Methods, systems, and techniques for handling the level triggered interrupt generated by the device assigned to the virtual machine are provided.

According to an embodiment, a system for handling a level triggered interrupt generated by a device assigned to a virtual machine running on a host machine includes a host machine that hosts a virtual machine and a device coupled to the host machine. The device is assigned to the virtual machine and generates one or more interrupts. The example system further includes an interrupt handler that includes an inject module, a mask module, and an access module. The inject module receives an interrupt generated by the device and injects the interrupt into the virtual machine. The mask module masks the interrupt, and in response to an indication that the virtual machine has attempted to access the device, unmasks the interrupt from the device. The access module receives the indication that the virtual machine has attempted to access the device.

According to another embodiment, a method of handling a level triggered interrupt generated by a device assigned to a virtual machine running on a host machine includes receiving, by one or more processors, an interrupt generated by a device assigned to a virtual machine running on a host machine. The example method further includes masking the interrupt and injecting the interrupt into the virtual machine. The example method also includes receiving an indication that the virtual machine has attempted to access the device, and in response to receiving the indication that the virtual machine has attempted to access the device, unmasking the interrupt from the device.

According to another embodiment, a non-transitory machine-readable medium includes a plurality of machine-readable instructions that when executed by one or more processors are adapted to cause the one or more processors to perform a method including receiving a level triggered interrupt generated by a device assigned to a virtual machine running on a host machine; masking the interrupt; injecting the interrupt into the virtual machine; receiving an indication that the virtual machine has attempted to access the device; and in response to receiving the indication that the virtual machine has attempted to access the device, unmasking the interrupt from the device.

This disclosure provides techniques for masking the interrupt generated by the device, reasonably determining that the virtual machine may have serviced the interrupt, unmasking the interrupt from the device, and possibly re-triggering the interrupt.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
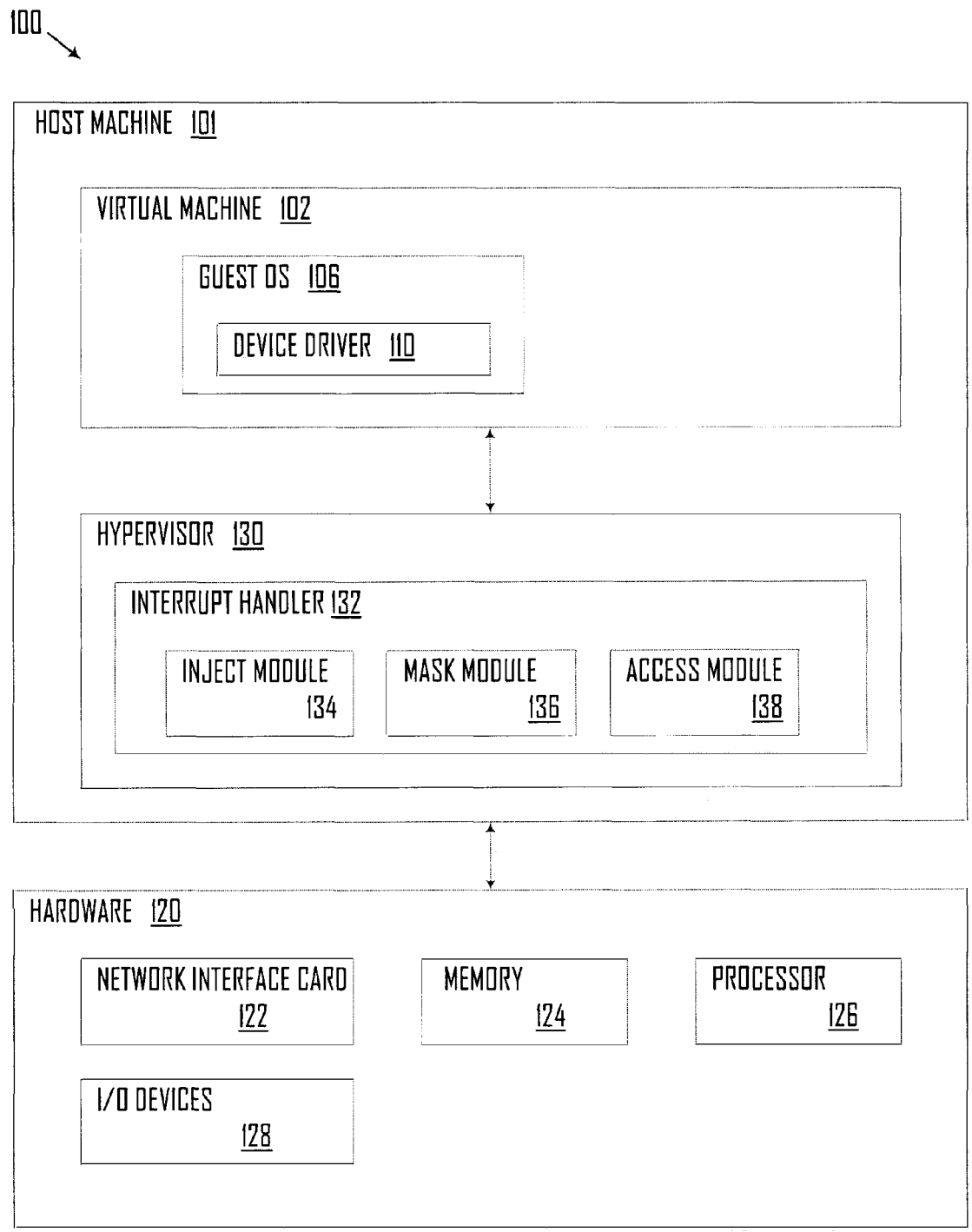
FIG. 1 is a simplified block diagram illustrating a system for handling a level triggered interrupt generated by a device assigned to a virtual machine running on a host machine, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example Host Machine
  A. Interrupt Handler
  B. Memory Modes
    1. Switching Between Memory Modes
    2. Time Outs
III. Example Methods
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A device that is assigned to a virtual machine (VM) running on a host machine may assert a level triggered interrupt. When the device asserts the level triggered interrupt, it continues to be asserted for as long as the interrupt condition continues. In contrast to a non-virtualized environment in which the host operating system handles the interrupts, in a virtualized environment, the VM handles the interrupts generated by the device. While waiting for the VM to handle the interrupt, the host machine may continuously be interrupted by the interrupt. It may be undesirable to place restrictions on the host machine and VM, such as requiring the host machine to instruct the VM to handle the interrupt within a certain time period (e.g., three milliseconds) from receiving the interrupt to prevent the interrupt from continuously interrupting the host machine. To alleviate this problem, while waiting on the VM to service the interrupt, it may be desirable for the interrupt to be masked in the host machine to prevent the interrupt from continuously interrupting the host machine.

Typically, a VM running on the host machine includes an emulated interrupt controller chip. To signal to the host machine that the interrupt generated by the device has been serviced, the VM may write an End-of-Interrupt (EOI) indicator to the emulated interrupt controller chip, thus signaling to the hypervisor that it may re-enable interrupts from the device. For example, the EOI may be indicated through write of the EOI register of the APIC or by re-sampling of the in-flight interrupt register of the APICs. Writing the EOI indicator to the emulated interrupt controller chip, however, is highly specific to the architecture and chipset emulation of the VM. The chipset emulation is typically implemented only for x86-based VMs making use of Advanced Programmable Interrupt Controllers (APICs) or I/O APICs. Accordingly, this technique may not be highly portable to other architectures. Further, different chipsets may be used for different architectures.

When handling the interrupt in the virtualized environment, it may be desirable to handle interrupts generated by the assigned to the VM independent of the chipset emulation of the VM. In this way, the handling of the interrupt in the virtualized environment may be more portable to host machines hosting VMs making use of different emulated chipsets and different architectures.

II. Example Host Machine

In an embodiment, a technique for handling a level triggered interrupt generated by a device assigned to a VM running on a host machine involves receiving an interrupt generated by the device, masking the interrupt, injecting the interrupt into the VM, receiving an indication that the VM has attempted to access the device, and in response to receiving the indication that the VM has attempted to access the device, unmasking the interrupt from the device.

The hypervisor may unmask the interrupt from the device based on an indication that the VM has attempted to access the device. Although not every attempt by the VM to access the device may result in the interrupt being serviced, the technique provides advantages. For example, even if the attempt by the VM to access the device does not result in the interrupt being serviced, the hypervisor may gate the rate at which interrupts are sent to the host machine. If the hypervisor unmasks the interrupt based on an attempt by the VM to access the device and the access does not actually service the interrupt, the device re-asserts the interrupt and the process starts again, thus allowing the device to generate another interrupt that interrupts the host machine.

Further, the technique of unmasking the interrupt based on the indication that the VM has attempted to access the device may deliver good performance for an emulated model. Additionally, this technique may provide platform independence for handling the interrupt generated by the device assigned to the VM. The hypervisor may unmask the interrupt generated by the device independent of a chipset emulation of the VM. For example, a device may be assigned to an emulated PowerPC® device without architecture specific code, and the interrupt generated by the device may be handled as described in the present disclosure. Further, this technique may be implemented on an x86 chip, PowerPC®, ARM® chip, or any other VM architecture that is modeled. Trademarks are the property of their respective owners.

FIG. 1 is a simplified block diagram 100 illustrating a system for handling a level triggered interrupt generated by a device assigned to a VM running on a host machine, according to an embodiment.

Diagram 100 includes a host machine 101 coupled to hardware 120. Hardware 120 includes network interface card (NIC) 122, memory 124, processor 126, and other I/O devices 128. Hypervisor 130 may provide VM 102 with access to hardware devices to perform input/output (I/O).

A host machine may run one or more VMs that run applications and services. Host machine 101 includes a VM 102 and a hypervisor 130. The hypervisor may allow multiple operating systems, called guests, to run on the same physical system by offering virtualized hardware to the guest operating system. The host machine may run multiple operating systems, concurrently and in isolation from other programs on a single system. VM 102 runs a guest operating system (OS) 106 that may be different from another guest OS system running in another VM that is running on host machine 101 (not shown) and may also be different from the host OS running on host machine 101 (not shown). The host or guest OS may include, for example, MICROSOFT® WINDOWS®, LINUX®, SOLARIS®, and MAC® OS. Trademarks are the property of their respective owners.

A. Interrupt Handler

Hypervisor 130 includes an interrupt handler 132 that handles interrupts generated by the device assigned to VM 102 running on host machine 101. Interrupt handler 132 includes an inject module 134, mask module 136, and access module 138. In an embodiment, inject module 134 receives an interrupt generated by the device. The device may be a physical hardware device or an emulated hardware device. Further, the interrupt may be a level triggered interrupt.

In an embodiment, mask module 136 masks the interrupt. Mask module 136 may mask the interrupt to prevent it from interrupting the host machine while the interrupt is waiting to be serviced by VM 102. Masking the interrupt generated by the device may prevent the host machine from reacting to any other interrupts generated by the device. Further, even though the processor may have knowledge of the existence of the pending interrupt, the processor may not be obligated to service the interrupt.

In an example, processor 126 includes a status register including interrupt mask bits, and mask module 136 may write to the interrupt mask bits to mask an interrupt generated by a device. In another example, processor 126 includes an interrupt mask register that is a read and write register that masks or unmasks interrupts. Mask module 126 may mask the interrupt by setting a mask bit in the interrupt mask register. In an example, mask module 130 clears the mask bit by writing a 0 to the mask bit, thereby masking the interrupt, and sets the mask bit by writing a 1 to the mask bit, thereby unmasking the generation of interrupts. In another example, mask module 130 clears the mask bit by writing a 1 to the mask bit, thereby masking the interrupt, and sets the mask bit by writing a 0 to the mask bit, thereby unmasking the generation of interrupts.

Mask module 136 may mask the interrupt at a myopic level using an interrupt controller in the system (not shown). Alternatively, mask module 136 may mask the interrupt at a lower level. For instance, the device may be a Peripheral Component Interconnect (PCI) device with which interrupt handler 132 is familiar. Although interrupt handler 132 may not know how to service the interrupt, mask module 136 may mask the interrupt by disabling a bit in the PCI device's configuration space.

In an embodiment, inject module 134 injects the interrupt into the VM. An interrupt may not always be delivered simultaneously and instantaneously to all guest virtual CPUs, because an interrupt in a virtual machine may not be a true interrupt; it is injected into the guest by the host machine. In an example, the hypervisor may create a virtual interrupt for the physical interrupt generated by the device and inject module 134 injects the virtual interrupt into the VM machine. Injecting the interrupt into the VM may include sending the created virtual interrupt to the VM. Further, the host may be running another guest virtual CPU or a different process. Accordingly, the precise timing typically required by interrupts may not always be possible.

Host machine 101 may not have a specific driver for the device and may be a pass-through device, thus masking the interrupt and injecting it into the VM for handling. VM 102 may include a guest OS 106 that executes a device driver 110 that communicates with the hardware devices. Device driver 110 may service the injected interrupt.

Hypervisor 130, however, may be unaware of when the interrupt is serviced or how to service the interrupt. Further, while the interrupt is masked, host machine 101 may be unable to acknowledge another interrupt request from the device. Accordingly, it may be desirable for interrupt handler 132 to determine when to unmask the interrupt so that other interrupts generated by the device or other devices may be serviced. In an example, interrupt handler 132 may unmask the interrupt from the device based on actions of the VM.

Interrupt handler 132 may unmask the interrupt from the device based on an indication that the VM has attempted to access the device. In an embodiment, access module 138 receives an indication that the VM has attempted to access the device. Hypervisor 130 may have visibility to attempted accesses that the VM makes to the device, even though hypervisor 130 does not know which accesses constitute service of the interrupt. By considering any attempted access to the device to be a possible service of the interrupt, hypervisor 130 obtains markers from the VM at which point it can unmask the interrupt from the device.

The device may be associated with memory regions that are mapped to the VM. Memory 124 may include a memory region that is mapped to the device assigned to VM 102. The device may make use of memory regions that allow the processor to interact with the device via reads and writes to memory 124. The memory regions may be implemented in different ways depending on the architecture and platform (e.g., Memory Mapped I/O (MMIO) or I/O port regions).

The hypervisor may facilitate access to the mapped memory regions. Access module 138 may detect whether or not the VM has attempted to access the device that generated the interrupt by looking at the applicable memory region. In an example, when the VM attempts to access the device, the access is trapped by access module 138. Access module 138 may trap the access attempt by VM 102 to the memory region, and perform an access to the device on behalf of the VM based on the trapped access attempt. In an example, if the VM attempts to read from the memory region mapped to the device, access module 138 traps the read request, performs the read request on behalf of the VM, and returns to the VM the data read from the memory region. In another example, if the VM attempts to write to the memory region mapped to the device, access module 138 traps the write request and performs the write request on behalf of the VM. Access module 138 may receive the indication that the VM has attempted to access the device based on the trapped access attempt.

In an example, the device communicates with device driver 110 and is a PCI device that exposes the memory regions through base address registers. Device driver 110 may clear a bit in the appropriate base address register to indicate that the interrupt generated by the device has been serviced. When VM 102 attempts to access the memory region that is mapped to the device (e.g., to clear the bit), access module 138 may trap the access attempt and perform the access on behalf of the VM, returning a result if applicable.

Hypervisor 130 may implement a guest physical address space that can point to any location in memory 124, which is the system physical address space. The host operating system may maintain a guest virtual address space. Guest OS 106 may create page tables to map virtual to physical memory, and hypervisor 130 may maintain its own copy of the page tables. When a virtual address inside guest OS 106 is accessed, hypervisor 130 may perform an initial page table translation from the guest virtual address to the guest physical address and then map the guest physical address to the respective system physical address. In an embodiment, hypervisor 130 maintains a page table that has direct guest virtual address to system physical address translations. This page table may speed up the process of retrieving the system physical address in memory 124 that is mapped to the device. Processor 126 may include a page table including a mapping of a virtual address space associated with the device to a physical address space corresponding to the memory region that is mapped to the device.

In an embodiment, in response to an indication that the VM has attempted to access the device, mask module 136 unmasks the interrupt from the device. Unmasking the interrupt may then allow the device to generate other interrupts that interrupt host machine 101. As discussed, even if the attempted access to the device by the VM does not service the interrupt, mask module 136 may still unmask the interrupt. The device may then assert another interrupt that is handled by interrupt handler 132 and injected into the VM.

B. Memory Modes

The device may be in different memory modes. In a first memory mode hypervisor 130 may be in a direct mapping mode, and in a second memory mode hypervisor 130 may be in a trapping mode. In the first memory, hypervisor 130 may map the memory regions directly into the address space of the VM. In the second memory mode, hypervisor 130 may trap the memory access (e.g., read or write) and perform the access on behalf of the VM, returning a result where applicable. When the device is in the first memory mode, access module 138 may be unable to receive an indication that the VM has attempted to access the device. In contrast, when the device is in the second memory mode, access module 138 may be able to receive the indication that the VM has attempted to access the device. The direct mapping mode may be enabled in the device whenever available due to the performance that direct mapping provides. As discussed above, however, direct mapping hides the device accesses from hypervisor 130.

1. Switching Between Memory Modes

In an embodiment, the memory modes may be switched from one mode to the other mode. Various algorithms in hypervisor 130 may optimize switching between memory modes to match the demands of I/O devices. As noted above, the direct mapping memory mode may be preferable for performance reasons, but does not provide hypervisor 130 the interaction necessary to make use of these guest accesses as triggers to unmask the interrupt from the device. In an example, hypervisor 130 may delay disabling the direct mapping mode until an interrupt condition occurs. For devices that do not make use of level triggered interrupts, this enables high performance throughout the life cycle of the device. Additionally, direct mapping may be re-enabled once guest access to the device is established through access to the memory regions. This cycle may repeat multiple times while an interrupt is serviced by the guest; interrupt occurs, interrupt masked, direct access disabled, guest access to device, direct access re-enabled, interrupt unmasked.

Figure 2:
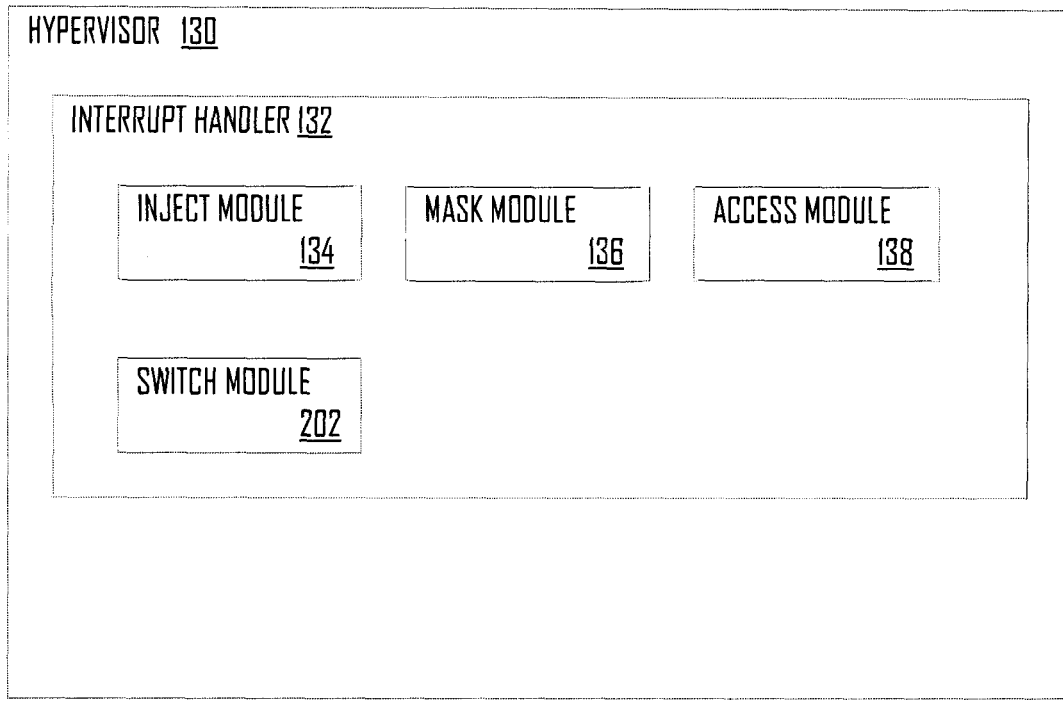
FIG. 2 is a simplified block diagram illustrating another system for handling the level triggered interrupt generated by the device assigned to the virtual machine running on the host machine, according to an embodiment.

FIG. 2 is a simplified block diagram 200 illustrating another system for handling the level triggered interrupt generated by the device assigned to the VM running on the host machine, according to an embodiment. Diagram 200 includes hypervisor 130 including interrupt handler 132. Interrupt handler includes inject module 134, mask module 136, and access module 138. Interrupt handler 132 further includes a switch module 202 that switches the device between the first memory mode and the second memory mode.

The direct mapping mode may be initially enabled in the device. In an example, switch module 202 selectively disables the direct mapping mode, forcing accesses to device memory regions to be trapped by hypervisor 130. This may provide hypervisor 130 with visibility of attempted device accesses by the VM, thus signaling to hypervisor 130 to unmask the interrupt from the device. In an embodiment, after inject module 134 receives the interrupt generated by the device, switch module 202 switches the device from the first memory mode to the second memory mode. Switch module 202 may switch the device from the first memory mode to the second memory mode any time after the interrupt is received. In this way, the VM may have direct access to the devices until the interrupt is received, thus improving performance. In an example, switch module 202 implements the switch from the first memory mode to the second memory mode based on inject module 134 receiving the interrupt. In another example, switch module 202 implements the switch from the first memory mode to the second memory mode based on inject module 134 injecting the interrupt into the VM. In another example, switch module 202 implements the switch from the first memory mode to the second memory mode based on mask module 136 masking the interrupt.

In an embodiment, after access module 138 receives the indication that the VM has attempted to access the device, switch module 202 switches the device from the second memory mode to the first memory mode. Switch module 202 may switch the device from the second memory mode to the first memory mode any time after the indication that the VM has attempted to access the device is received. In this way, hypervisor 130 may assume that the VM serviced the interrupt based on the attempted access and switch back to the first memory mode (e.g., direct mapping).

After the interrupt from the device is unmasked, the device may generate another interrupt. If the interrupt injected into the VM was serviced by the attempted VM access, the interrupt is serviced and remains de-asserted until a new interrupt condition is asserted. If the interrupt injected into the VM was not serviced, however, inject module 134 may receive a second interrupt corresponding to the initial interrupt and injecting the second interrupt into the VM includes re-injecting the initial interrupt into the VM.

2. Time Outs

Hypervisor 130 may have restrictive overhead in enabling and disabling the memory modes. In this case, as discussed above, the direct mapping mode may be enabled until inject module 134 receives an interrupt. In an embodiment, after inject module 134 receives the interrupt, the direct mapping mode is disabled, the trapping mode is enabled, and a timer is started.

In an embodiment, switch module 202 determines whether the interrupt is pending after a threshold period of time elapses. When switch module 202 determines that the interrupt is not pending after the threshold period of time elapses, switch module 202 switches the device from the second memory mode to the first memory mode. When switch module 202 determines that the interrupt is pending after the threshold period of time elapses, switch module 202 may increase the threshold period of time.

Each interrupt generated by the device may extend the timeout of the timer. When the timer expires and the VM be in a state where there is no pending interrupt from the device, the direct mapping mode may be re-enabled. Heuristics may then be used to determine the proper timeout for various device types. For example, PCI device types may be determined generically by hypervisor 130 using the PCI class code for the device, allowing appropriate timeouts to be automatically selected. Devices with low interrupt frequency may make use of short timeouts, enabling these devices to predominantly operate in the direct mapping mode. In contrast, devices with high interrupt frequency may use longer timeouts to effectively disable the direct mapping mode and avoid switching overhead. For instance, assigned NIC 122 may use a timeout slightly more than one second to reduce latency for tests such as ping.

III. Example Methods

Figure 3:
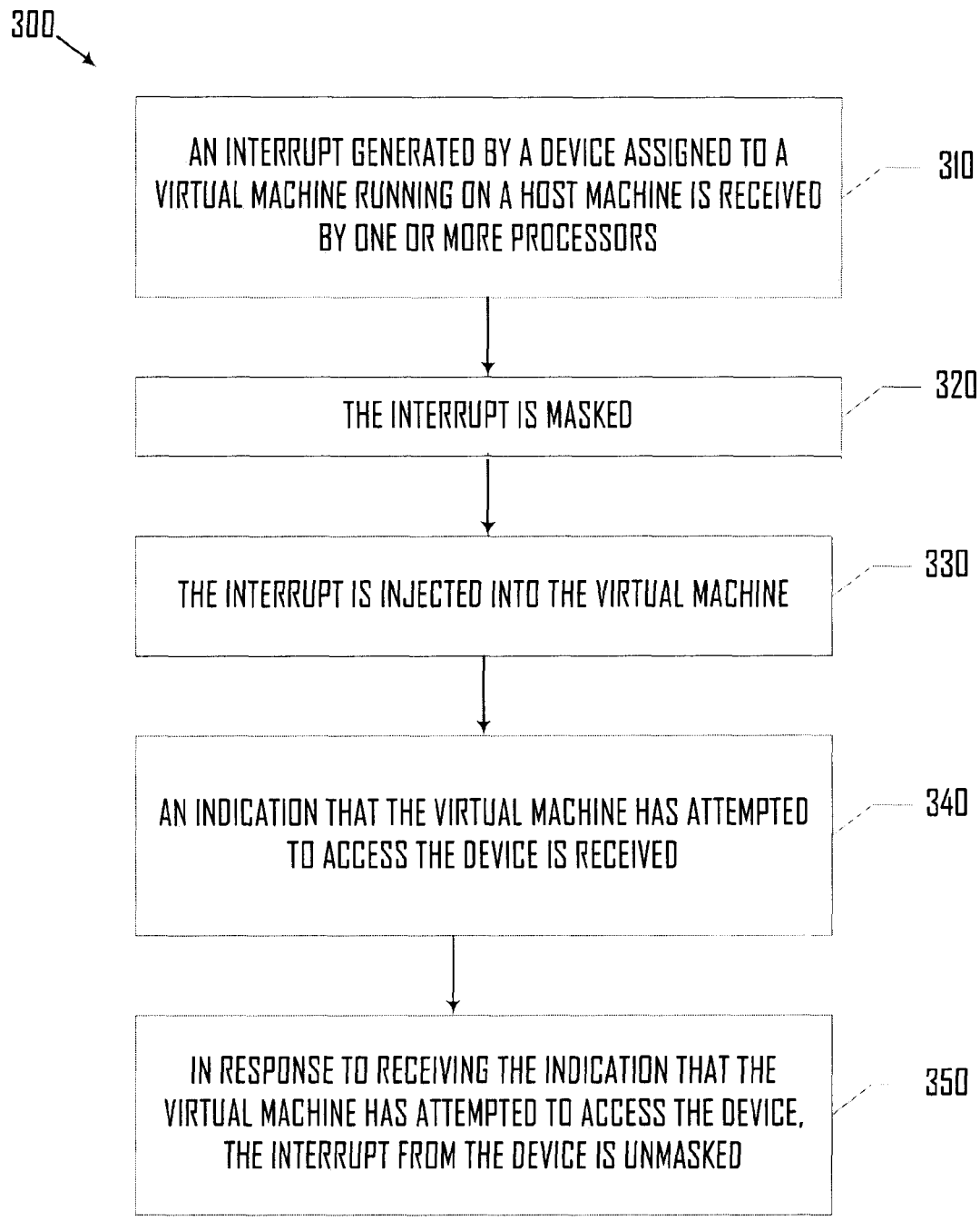
FIG. 3 is a simplified flowchart illustrating a method of handling the level triggered interrupt generated by the device assigned to the virtual machine running on the host machine, according to an embodiment.

FIG. 3 is a simplified flowchart illustrating a method 300 of handling the level triggered interrupt generated by the device assigned to the VM running on the host machine, according to an embodiment. Method 300 is not meant to be limiting and may be used in other applications.

Method 300 includes steps 310-350. In a step 310, an interrupt generated by a device assigned to a VM running on a host machine is received by one or more processors. In an example, inject module 134 receives an interrupt generated by a device assigned to a VM running on a host machine.

In a step 320, the interrupt is masked. In an example, mask module 136 masks the interrupt. In a step 330, the interrupt is injected into the VM. In an example, inject module 134 injects the interrupt into the VM. In a step 340, an indication that the VM has attempted to access the device is received. In an example, access module 138 receives an indication that the VM has attempted to access the device. In a step 350, in response to receiving the indication that the VM has attempted to access the device, the interrupt from the device is unmasked. In an example, in response to access module 138 receiving the indication that the VM has attempted to access the device, mask module 136 unmasks the interrupt from the device.

In an example, host machine 101 is coupled to a network (not shown), and NIC 122 is assigned to VM 102 and communicates with device driver 110. When NIC 122 receives a packet via the network, NIC 122 may generate a level triggered interrupt that is detected by host machine 101, signaling to host machine 101 that NIC 122 has a packet to process. Hypervisor 130 may not know how to service the interrupt because device driver 110 services interrupts generated by NIC 122 and host machine 101 does not service interrupts generated by NIC 122. Hypervisor 130 may mask the interrupt by, for example, writing to a register in processor 126, thereby enabling host machine 101 to avoid being interrupted by NIC 122 until the interrupt is unmasked. Hypervisor 130 may then inject the interrupt into VM 102 to signal to VM 102 that NIC 122 needs to be serviced. From the time that hypervisor 130 injected the interrupt into VM 102, VM 102 may attempt to access memory that is mapped to NIC 122 in memory 124. The memory access may be a read access or a write access. In an example, VM 102 may service the interrupt generated by NIC 122 by processing the packet. In another example, VM 102 may request information from NIC 122, such as NIC 122's Media Access Control (MAC) Address, that does not service the interrupt generated by NIC 122. Based on an indication that VM 102 has attempted to access memory that is mapped to NIC 122, hypervisor 130 unmasks the interrupt from NIC 122. Using the above examples, the interrupt generated by NIC 122 may be unmasked based on VM 102 processing the packet or based on VM 102 requesting NIC 122's MAC address.

It is also understood that additional method steps may be performed before, during, or after steps 310-350 discussed above. For example, method 300 may include a step of trapping an access attempt by the VM to a memory region mapped to the device assigned, where the indication that the VM has attempted to access the device is based on the trapped access attempt. In another example, method 300 may include a step of generating a virtual interrupt based on the interrupt generated by the device. It is also understood that one or more of the steps of method 300 described herein may be omitted, combined, or performed in a different sequence as desired.

Figure 4:
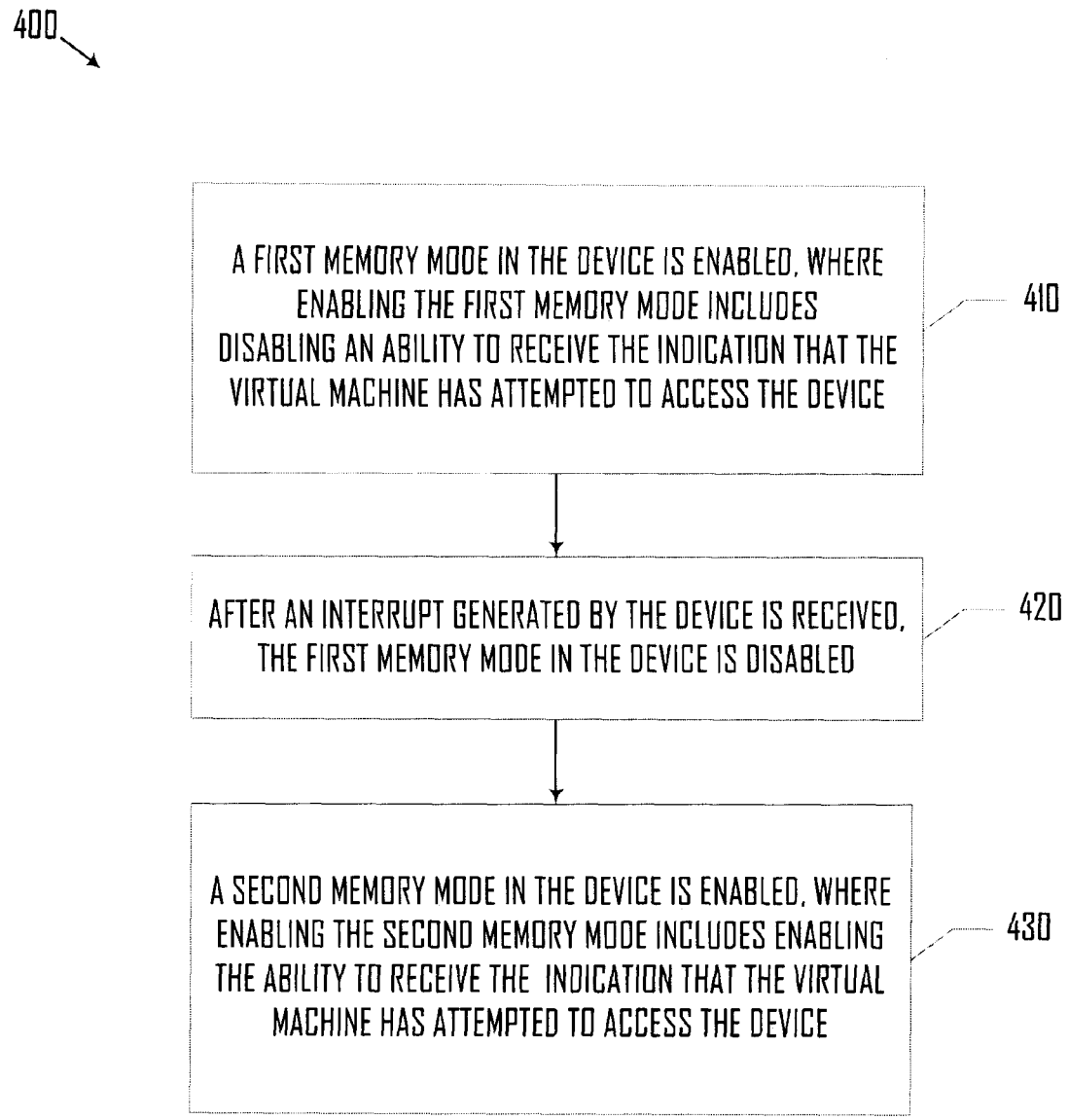
FIG. 4 is a simplified flowchart illustrating a method of switching from a first memory mode to a second memory mode, according to an embodiment.

FIG. 4 is a simplified flowchart illustrating a method 400 of switching from a first memory mode to a second memory mode, according to an embodiment. Method 400 is not meant to be limiting and may be used in other applications.

Method 400 includes steps 410-430. In a step 410, a first memory mode in a device is enabled, where enabling the first memory mode includes disabling an ability to receive an indication that the VM has attempted to access the device. In an example, switch module 202 enables a first memory mode in the device, where enabling the first memory mode includes disabling an ability to receive an indication that the VM has attempted to access the device.

In a step 420, after an interrupt generated by the device is received, the first memory mode in the device is disabled. In an example, after an interrupt generated by the device is received, switch module 202 disables the first memory mode in the device.

In a step 430, a second memory mode in the device is enabled, where enabling the second memory mode includes enabling the ability to receive the indication that the VM has attempted to access the device. In an example, switch module 202 enables a second memory mode in the device, where enabling the second memory mode includes enabling the ability to receive the indication that the VM has attempted to access the device.

It is also understood that additional method steps may be performed before, during, or after steps 410-430 discussed above. It is also understood that one or more of the steps of method 400 described herein may be omitted, combined, or performed in a different sequence as desired. For example, step 430 of enabling the second memory mode in the device may automatically implement step 420 of disabling the first memory mode in the device.

Figure 5:
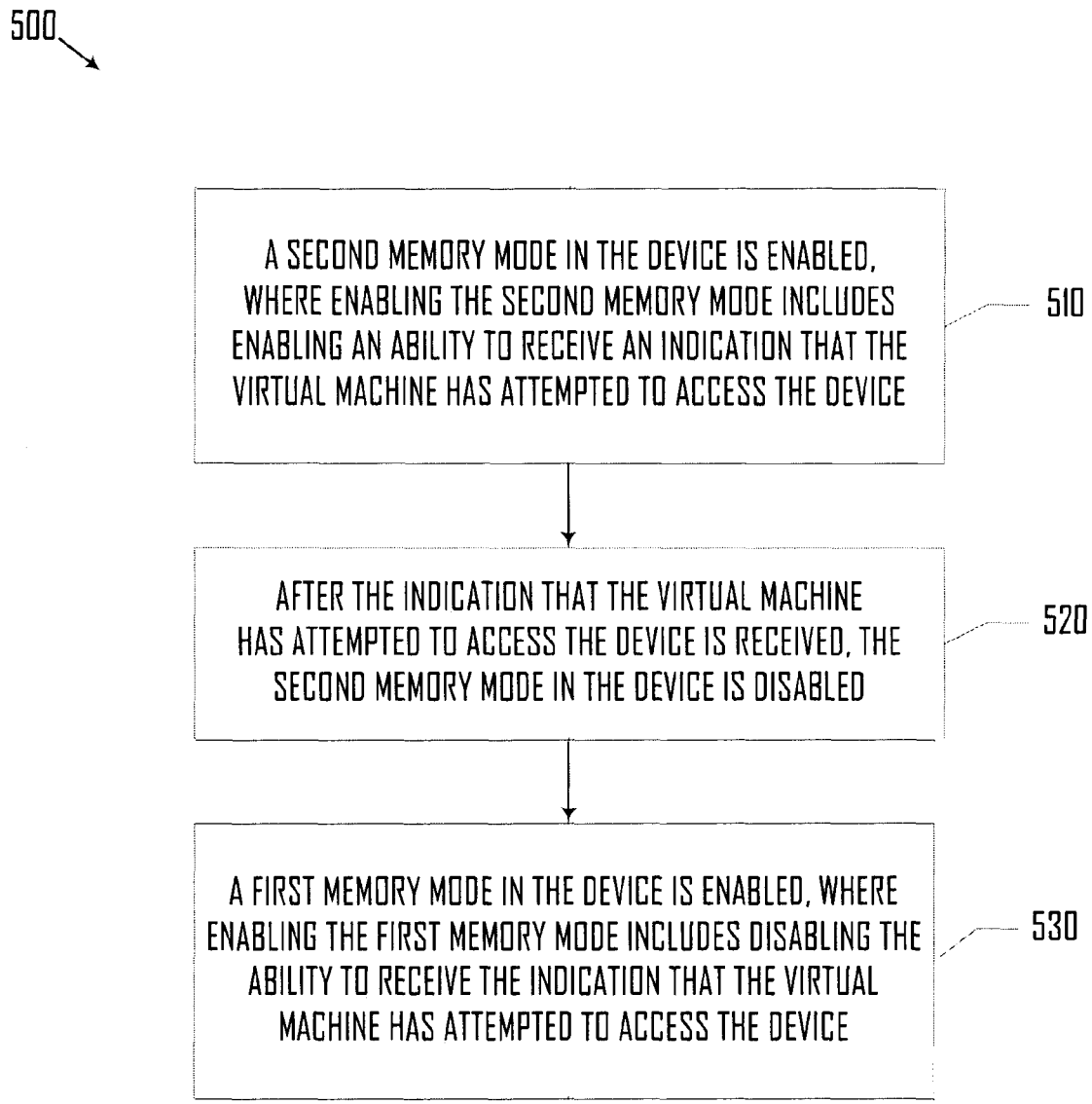
FIG. 5 is a simplified flowchart illustrating a method of switching from the second memory mode to the first memory mode, according to an embodiment.

FIG. 5 is a simplified flowchart illustrating a method 500 of switching from the second memory mode to the first memory mode, according to an embodiment. Method 500 is not meant to be limiting and may be used in other applications.

Method 500 includes steps 510-530. In a step 510, a second memory mode in a device is enabled, where enabling the second memory mode includes enabling an ability to receive an indication that the VM has attempted to access the device. In an example, switch module 202 enables a second memory mode in the device, where enabling the second memory mode includes enabling an ability to receive the indication that the VM has attempted to access the device.

In a step 520, after the indication that the VM has attempted to access the device is received, the second memory mode in the device is disabled. In an example, after the indication that the VM has attempted to access the device is received, switch module 202 disables the second memory mode in the device.

In a step 530, a first memory mode in the device is enabled, where enabling the first memory mode includes disabling the ability to receive the indication that the VM has attempted to access the device. In an example, switch module 202 enables a first memory mode in the device, where enabling the first memory mode includes disabling the ability to receive the indication that the VM has attempted to access the device.

It is also understood that additional method steps may be performed before, during, or after steps 510-530 discussed above. It is also understood that one or more of the steps of method 500 described herein may be omitted, combined, or performed in a different sequence as desired. For example, step 530 of enabling the first memory mode in the device may automatically implement step 520 of disabling the second memory mode in the device.

IV. Example Computing System

Figure 6:
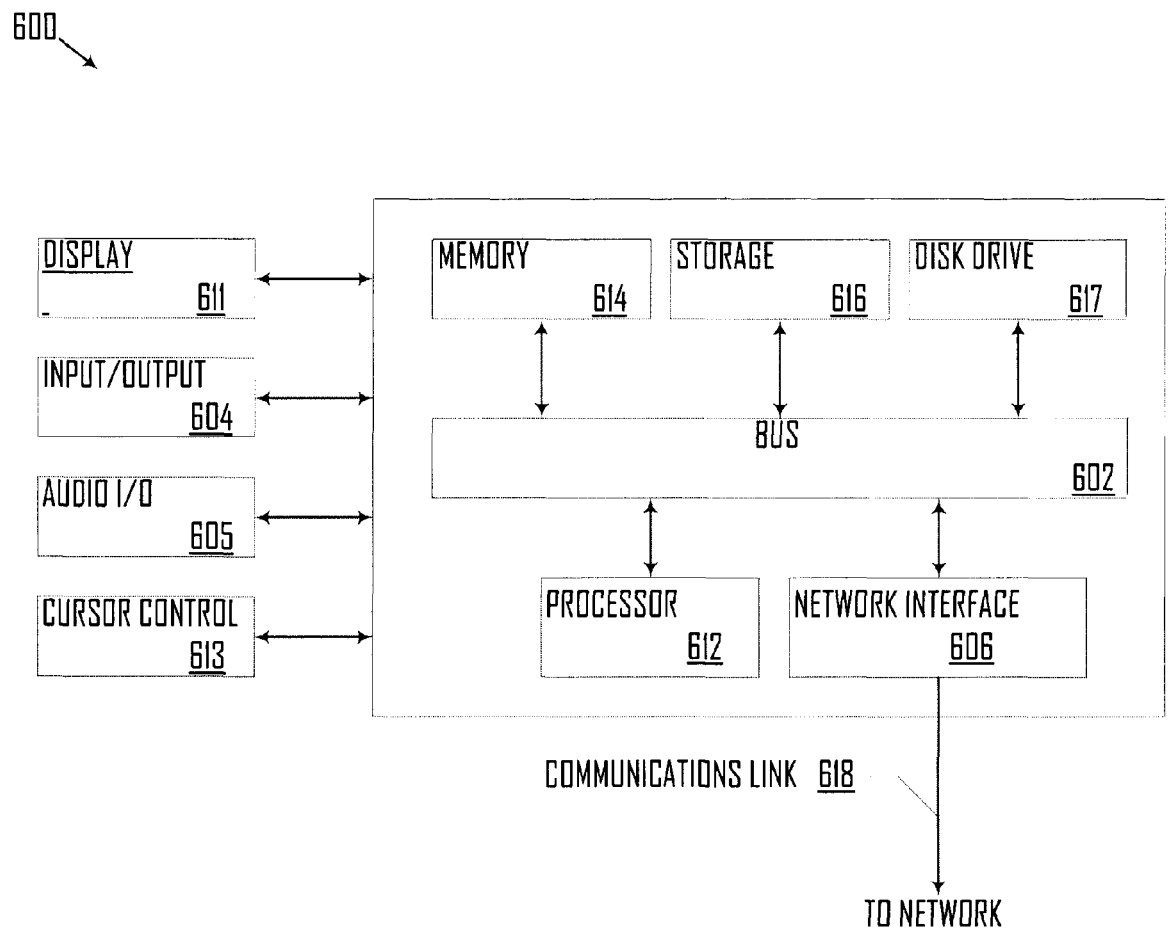
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, host machine 101 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A system for handling a level triggered interrupt generated by a device assigned to a virtual machine running on a host machine, the system comprising:
   a host machine that hosts a virtual machine;
   a device coupled to the host machine, wherein the device is assigned to the virtual machine and generates one or more interrupts;
   an interrupt handler that includes:
      an inject module that receives an interrupt generated by the device and injects the interrupt into the virtual machine;
      a mask module that masks the interrupt, and in response to an indication that the virtual machine has attempted to access the device, unmasks the interrupt from the device; and
      an access module that receives the indication that the virtual machine has attempted to access the device; and
   a memory including a memory region that is mapped to the device assigned to the virtual machine, wherein the access module traps an access attempt by the virtual machine to the memory region, and the access module receives the indication that the virtual machine has attempted to access the device based on the trapped access attempt.

2. The system of claim 1, wherein the access module performs an access to the device on behalf of the virtual machine based on the trapped access attempt.

3. The system of claim 1, further comprising:
a page table that includes a mapping of a virtual address space associated with the device to a physical address space corresponding to the memory region that is mapped to the device.

4. The system of claim 1, further comprising:
a switch module that switches the device between a first memory mode and a second memory mode,
wherein when the device is in the first memory mode the access module is unable to receive the indication that the virtual machine has attempted to access the device, and when the device is in the second memory mode the access module is able to receive the indication that the virtual machine has attempted to access the device.

5. The system of claim 4, wherein after the inject module receives the interrupt generated by the device the switch module switches the device from the first memory mode to the second memory mode.

6. The system of claim 4, wherein after the access module receives the indication that the virtual machine has attempted to access the device the switch module switches the device from the second memory mode to the first memory mode.

7. The system of claim 4, wherein the switch module determines whether the interrupt is pending after a threshold period of time elapses, and
when the switch module determines that the interrupt is not pending after the threshold period of time elapses the switch module switches the device from the second memory mode to the first memory mode.

8. The system of claim 7, wherein when the switch module determines that the interrupt is pending after the threshold period of time elapses the switch module increases the threshold period of time.

9. The system of claim 4, wherein the first memory mode is a direct mapping mode and the second memory mode is a trapping mode.

10. The system of claim 1, wherein the interrupt is a level triggered interrupt.

11. The system of claim 1, wherein the mask module unmasks interrupts from the device independent of a chip set emulation of the virtual machine.

12. A method of handling a level triggered interrupt generated by a device assigned to a virtual machine running on a host machine, the method comprising:
receiving, by one or more processors, an interrupt generated by a device assigned to a virtual machine running on a host machine;
masking the interrupt;
injecting the interrupt into the virtual machine;
receiving an indication that the virtual machine has attempted to access the device;
in response to receiving the indication that the virtual machine has attempted to access the device, unmasking the interrupt from the device; and
trapping an access attempt by the virtual machine to a memory region that is mapped to the device, wherein the receiving an indication that the virtual machine has attempted to access the device is based on the trapping an access attempt.

13. The method of claim 12, further comprising:
receiving a second interrupt generated by the device;
masking the second interrupt;
injecting the second interrupt into the virtual machine, wherein the injecting the second interrupt into the virtual machine comprises re-injecting the first interrupt into the virtual machine;
receiving a second indication that the virtual machine has attempted to access the device; and
in response to receiving the second indication that the virtual machine has attempted to access the device, unmasking interrupts from the device.

14. The method of claim 12, wherein the trapping an access attempt comprises trapping a read access or a write access from the virtual machine to a memory region that is mapped to the device.

15. The method of claim 12, wherein the receiving an interrupt generated by a device comprises receiving a level triggered interrupt.

16. The method of claim 12, further comprising:
enabling a first memory mode in the device, wherein the enabling a first memory mode comprises disabling an ability to receive the indication that the virtual machine has attempted to access the device;
after the receiving an interrupt generated by a device, disabling the first memory mode in the device; and
enabling a second memory mode in the device, wherein the enabling a second memory mode comprises enabling the ability to receive the indication that the virtual machine has attempted to access the device.

17. The method of claim 12, further comprising
enabling a second memory mode in the device, wherein the enabling a second memory mode comprises enabling an ability to receive the indication that the virtual machine has attempted to access the device;
after the receiving an indication that the virtual machine has attempted to access the device, disabling the second memory mode in the device; and
enabling a first memory mode in the device, wherein the enabling a first memory mode comprises disabling the ability to receive the indication that the virtual machine has attempted to access the device.

18. A non-transitory machine-readable medium comprising a plurality of machine-readable instructions that when executed by one or more processors are adapted to cause the one or more processors to perform a method comprising:
receiving a level triggered interrupt generated by a device assigned to a virtual machine running on a host machine;
masking the interrupt;
injecting the interrupt into the virtual machine;
receiving an indication that the virtual machine has attempted to access the device;
in response to receiving the indication that the virtual machine has attempted to access the device, unmasking the interrupt from the device; and
trapping an access attempt by the virtual machine to a memory region that is mapped to the device, wherein the receiving an indication that the virtual machine has attempted to access the device is based on the trapping an access attempt.

* * * * *